(12) United States Patent
Ginter et al.

(10) Patent No.: US 9,808,763 B2
(45) Date of Patent: Nov. 7, 2017

(54) CATALYST SYSTEM FOR LEAN NOX REDUCTION WITH HYDROCARBONS

(71) Applicant: Caterpillar Inc., Peoria, IL (US)

(72) Inventors: David Ginter, Commerce Township, MI (US); Ling Deng, Dunlap, IL (US); Paul Park, Peoria, IL (US); Scott B. Fiveland, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/962,385

(22) Filed: Dec. 8, 2015

(65) Prior Publication Data

US 2017/0157563 A1 Jun. 8, 2017

(51) Int. Cl.
*B01D 53/94* (2006.01)

(52) U.S. Cl.
CPC ..... *B01D 53/9418* (2013.01); *B01D 53/9431* (2013.01); *B01D 53/9459* (2013.01); *B01D 53/9495* (2013.01); *B01D 2251/21* (2013.01); *B01D 2255/904* (2013.01)

(58) Field of Classification Search
None
See application file for complete search history.

(56) References Cited

U.S. PATENT DOCUMENTS

| 6,703,343 B2 | 3/2004 | Park |
| 6,706,660 B2 | 3/2004 | Park |
| 7,431,905 B2 | 10/2008 | Hancu et al. |
| 7,650,747 B2 | 1/2010 | Sloane |
| 7,718,153 B2 | 5/2010 | Sobolevskiy et al. |
| 7,743,602 B2 | 6/2010 | Kalyanaraman et al. |
| 7,976,805 B2 | 7/2011 | Sobolevskiy et al. |
| 7,998,444 B2 | 8/2011 | Kwan |
| 8,245,500 B2 | 8/2012 | Fisher et al. |
| 8,286,419 B2 | 10/2012 | Levijoki et al. |
| 8,524,183 B2 | 9/2013 | Ifrah et al. |
| 8,974,738 B2 | 3/2015 | Chavannavar |
| 2003/0118960 A1 | 6/2003 | Balmer-Millar et al. |
| 2007/0289291 A1 | 12/2007 | Rabinovich et al. |
| 2008/0317652 A1 | 12/2008 | Bono et al. |
| 2009/0173058 A1 | 7/2009 | Vitse et al. |
| 2010/0146947 A1 | 6/2010 | Liu et al. |
| 2011/0047995 A1 | 3/2011 | Lewis et al. |
| 2011/0100215 A1 | 5/2011 | Bi et al. |
| 2011/0206583 A1 | 8/2011 | Larcher et al. |
| 2014/0318102 A1 | 10/2014 | Erkfeldt |

FOREIGN PATENT DOCUMENTS

WO 03033118 A1 4/2003

*Primary Examiner* — Walter D Griffin
*Assistant Examiner* — Jelitza Perez

(57) ABSTRACT

A NOx control system includes a lean NOx catalyst and an alcohol generator. The lean NOx catalyst includes a substrate and a hydrocarbon selective catalytic reduction (HC-SCR) catalyst disposed on the substrate. The HC-SCR catalyst catalyzes a reduction of NOx with an alcohol. The alcohol generator generates the alcohol.

9 Claims, 2 Drawing Sheets

CATALYST SYSTEM FOR LEAN NOX REDUCTION WITH HYDROCARBONS

TECHNICAL FIELD

The present disclosure relates generally to engine exhaust systems and, more particularly, to a process of reducing oxides of nitrogen in exhaust using exhaust components.

BACKGROUND

It is generally known that internal combustion engines produce exhaust that contains a variety of federally regulated constituents. For example, the various oxides of nitrogen (NOx) such as NO, $NO_2$, and the like are regulated. To effectively reduce the NOx concentrations in the exhaust stream of lean burning engines including natural gas, gasoline, and diesel engines, the use of selective catalytic reduction of NOx with a hydrocarbon in oxygen rich conditions (lean NOx catalyst systems) is actively being pursued.

Unfortunately, many catalysts or catalytic systems that have been utilized for lean burn engines to date suffer from low removal of NOx, inadequate catalyst durability, low thermal stability and a limited temperature window of operation. For example most commercially available lean NOx catalytic systems for lean burn engines achieve less than 20% NOx reduction as a passive system and possibly up to 40% for active systems (i.e. when supplemental hydrocarbon reductant is introduced into the exhaust stream). In addition, most commercially available lean NOx catalytic systems also are subjected to sulfur poisoning, from the minimal amounts of sulfur found in many fuels and lubricants, resulting in low catalyst durability.

Such active catalytic systems involving lean NOx catalysts require a sufficient concentration of hydrocarbon (HC) species to be present. In other words, in combustion exhaust purification systems having an oxygen environment above 4% concentration, some type of reducing agent, usually a hydrocarbon compound such as diesel fuel, must be introduced into the exhaust in order to achieve acceptable reduction levels of NOx compounds. However, these and other such exhaust gas after treatment systems introduce fuel or a hydrocarbon source from a secondary supply system that tends to reduce the overall fuel efficiency of the engine system or necessitate maintaining the secondary supply system.

An exemplary exhaust gas after treatment system employing an ether such as triglyme that is added to a hydrocarbon source and injected into the exhaust system is described in U.S. Patent Application Publication No. 2014/03181102 ("the '102 publication"), published Oct. 30, 2014. The exhaust gas after treatment system described in the '102 publication includes a dosing system with tank of dosing fluid that is injected into the exhaust stream. This dosing fluid include a fuel such as diesel and activator material that is an oxygenated hydrocarbon. In a particular example, the activator material is the ether, triglyme. This triglyme is mixed with the diesel and maintained in a separate tank from the fuel tank for the engine.

While the system of the '102 publication may be configured to reduce NOx, such systems may have drawbacks. For example, maintaining the separate dosing fluid is bothersome for the end user and represents an added expense of operating the engine. If the dosing fluid is not maintained, the exhaust may emit NOx at levels that exceed federal guidelines and may result in fines. In addition, if the dosing fluid is not maintained, the catalytic system in the exhaust system may be damaged.

Accordingly, there is a need for improved exhaust gas after treatment system to address the problems described above and/or problems posed by other conventional approaches.

It will be appreciated that this background description has been created to aid the reader, and is not a concession that any of the indicated problems were themselves known previously in the art.

SUMMARY

Aspects of the disclosure are capable of providing improved exhaust gas after treatment systems.

An aspect of the disclosure pertains to a NOx control system to selectively reduce NOx present in an exhaust. The NOx control system includes a lean NOx catalyst and an alcohol generator. The lean NOx catalyst includes a substrate and a hydrocarbon selective catalytic reduction (HC-SCR) catalyst disposed on the substrate. The HC-SCR catalyst catalyzes a reduction of NOx with an alcohol. The alcohol generator generates the alcohol.

Another aspect of the disclosure relates to a method of selectively reducing NOx present in an exhaust. In this method, a NOx is reduced with an alcohol and a hydrocarbon selective catalytic reduction (HC-SCR) catalyst. In addition, the alcohol is generated.

Yet another aspect of the disclosure pertains to a method of selectively reducing NOx in an exhaust. In this method, it is determined if an amount of a native hydrocarbon in the exhaust is sufficient to reduce the NOx. In addition, a supplemental hydrocarbon is added to the exhaust in a quantity sufficient to reduce the NOx in response to determining the amount of the native hydrocarbon is insufficient to reduce the NOx.

It will be understood that the disclosure is not limited in its application to the details of construction and to the arrangements of the components set forth in the following description or illustrated in the drawings. The disclosed device and method are capable of aspects in addition to those described and of being practiced and carried out in various ways. Also, it will be understood that the terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the various aspects. Therefore, the claims will be regarded as including such equivalent constructions insofar as they do not depart from the spirit and scope of the various aspects.

The drawings presented are intended solely for the purpose of illustration and therefore, are neither desired nor intended to limit the subject matter of the disclosure to any or all of the exact details of construction shown, except insofar as they may be deemed essential to the claims.

DETAILED DESCRIPTION

Figure 1:
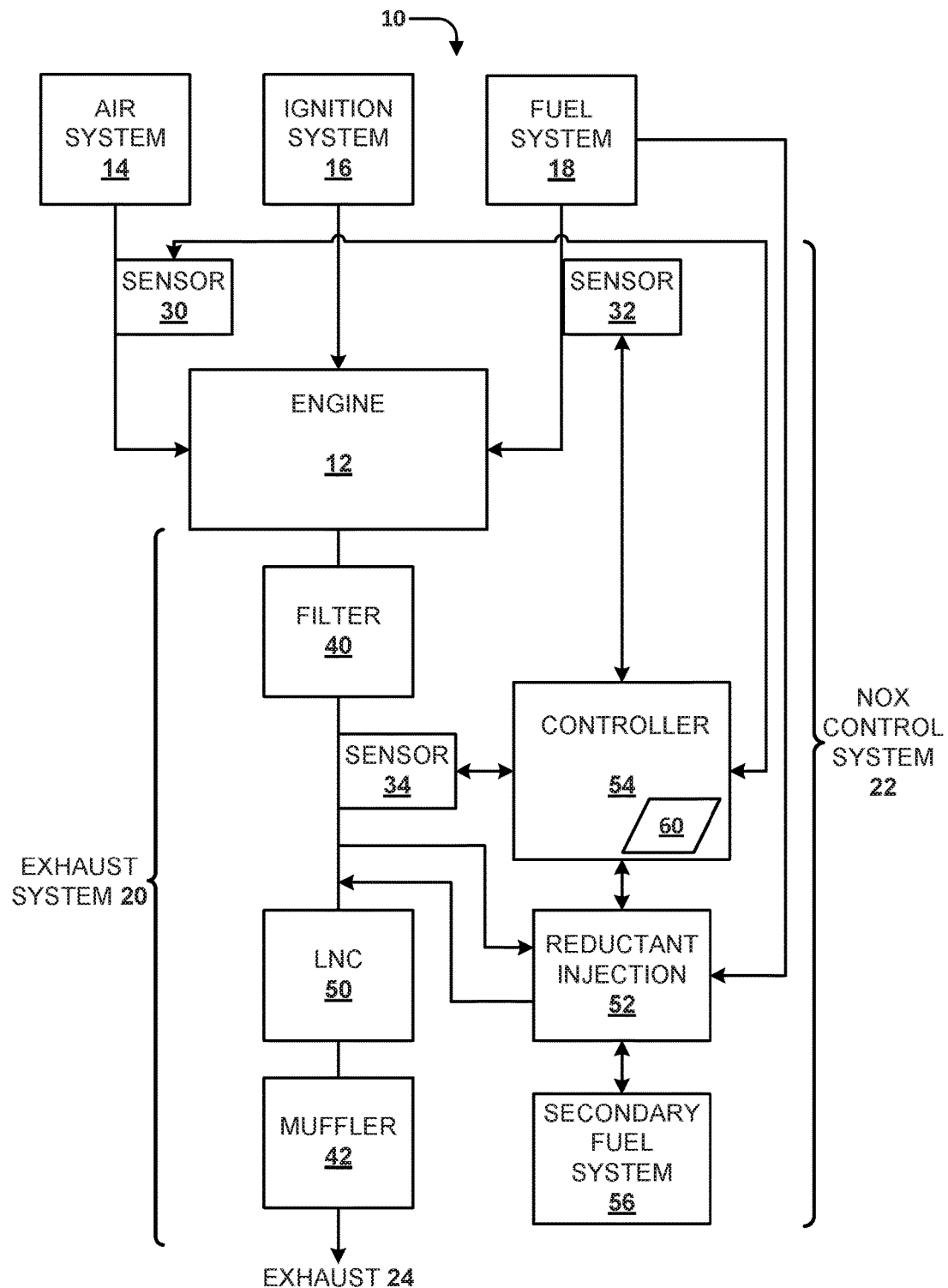
FIG. 1 is a block diagram of an engine system suitable for use with various aspects of the disclosure.

FIG. 1 is a block diagram of an engine system 10 suitable for use with various aspects of the disclosure. As shown in FIG. 1, the engine system 10 includes an engine 12, an air system 14, an ignition system 16, a fuel system 18, and an exhaust system 20. As is generally known, oxides of nitrogen (NOx) such as NO, $NO_2$, and the like are commonly produced combustion products. The engine system 10 includes a NOx control system 22 to remove or reduce NOx from an exhaust 24 emitted by the engine 12.

The engine 12 is a combustion engine configured to burn a fuel such as natural gas, methane, gasoline, diesel, suitable alcohols, suitable oils, other suitable combustible fuel known in the art, and mixtures thereof. The engine 12 is operable to provide power for any suitable application. Examples of suitable applications include fixed and mobile applications. Examples of fixed applications include providing power as part of a generator set, pumps, and the like. Examples of mobile applications include providing power for various machines in industries such as, for example, mining, construction, farming, transportation, or another industry known in the art.

The air system 14 includes any suitable air system and the various components known in the art. Examples of such components include filters, ducts, valves, compressors, superchargers, turbochargers, and the like (not shown). The air system 14 may include a throttle position sensor 30 configured to sense a throttle position. In general, the throttle position is an input used to determine air and/or fuel flow to the engine 12. While the throttle position sensor 30 is shown as being associated with the air system 14, in other examples, the throttle position sensor 30 may be associated with any suitable component of the engine system 10.

The ignition system 16 includes any suitable ignition system and the various components known in the art. Examples of such components include distributers, electronic ignition systems, spark plugs, plug wires, and the like (not shown).

The fuel system 18 includes any suitable fuel system and the various components known in the art. Examples of such components include a fuel tank, fuel pump, filters, fuel lines, fuel injectors, and the like (not shown). The fuel system 18 may include a fuel quality sensor 32 configured to sense one or more qualities of a fuel combusted in the engine 12. Examples of fuel qualities sensed by the fuel quality sensor 32 may include methane number (MN), octane or motor octane number (MON), and the like. In a particular example, the fuel quality sensor 32 is configured to sense the MN of the fuel in the fuel system 18 as the fuel is delivered to the engine 12 for combustion. Typically, the MN of the fuel corresponds to a knock resistance of the fuel. However, in addition to knock resistance, the MN of fuel provides an indication of the composition of the fuel. For example, by definition, the MN of methane is 100 and the MN of hydrogen is 0. The MN may also be calculated based on the ratio of reactive hydrogen atoms to carbon atoms with a 4:1 H/C ratio corresponding to an MN of 100 and a 3:1 H/C ratio corresponds to an MN of about 45. It has been observed that as the MN decreases, the amount of reactive hydrocarbon (HC) in the exhaust 24 increases in an absolute sense as well as relative to NOx present in the exhaust 24. As the HC amount rises relative to the NOx amount, this naturally occurring HC may react with the NOx in the lean NOx catalyst to reduce the NOx to $N_2$ and the amount of HC added to the exhaust may be reduced. In response to the HC/NOx ratio reaching a predetermined stoichiometric value, the generation or dosing of addition HC in the exhaust may be stopped or reduced. For example, if the HC naturally present in the exhaust 24 meets or exceeds the amount HC needed to reduce all the NOx to $N_2$, then the generation or dosing of addition HC in the exhaust 24 may be stopped or reduced.

The exhaust system 20 includes any suitable exhaust system and the various components known in the art. Examples of such components include headers, collectors, turbochargers, particulate filters, mufflers, exhaust pipes, and the like (some components not shown). The exhaust system 20 may include an exhaust sensor 34, particle filter 40 and muffler 42. In general, the exhaust sensor 34 may be configured to sense: 1) if NOx is present in the exhaust and/or at what concentration; 2) if HC or other NOx reducing agents are naturally present in the exhaust 24 and/or at what concentration; and/or 3) if reactants capable of being synthesized into NOx reducing agents are naturally present in the exhaust 24 and/or at what concentration. More particularly, the exhaust sensor 34 may be configured to sense NOx, alkenes, alkanes, $O_2$, HC, and the like. In a specific example, the exhaust sensor 34 may include a metal oxide ceramic sensor such as a yttria-stabilized zirconia sensor configured to sense NOx, alkenes, alkanes, $O_2$, and HC.

In general, the particle filter 40 is optionally included to remove particles from the exhaust 24. The muffler 42 is optionally included to reduce or modify the sound of the exhaust 24.

The NOx control system 22 may be configured to monitor and/or reduce NOx emissions from the exhaust system 20. To monitor the NOx emissions from the exhaust system 20, the NOx control system 22 may include and/or be configured to communicate with or receive signals from the throttle position sensor 30, the fuel quality sensor 32, and the exhaust sensor 34. The NOx control system 22 may include various catalytic systems such a lean NOx catalyst (LNC) or the like to reduce NOx emissions from the exhaust system 20. In a particular example, the NOx control system 22 may include a LNC 50. As described herein, depending upon the type of fuel used by the engine 12, the type of combustion, etc., the NOx control system 22 may optionally include a reductant injection system 52, and a controller 54.

The LNC 50 may be configured to catalyze one or more reactions. More particularly, the LNC 50 may be configured to catalyze one or more reactions using hydrocarbons as NOx reductants. The hydrocarbons may be those naturally present in the exhaust 24 (i.e., "native" hydrocarbons), synthesized in the exhaust 24 using naturally present molecules, and/or hydrocarbons may be added to the exhaust 24. The LNC 50 may be selective for NOx reduction compared to competing reactions that might oxidize the hydrocarbons to $CO_2$ and water thus rendering them unable to facilitate conversion of NOx to $N_2$. That is, the LNC 50 may include a HC selective catalytic reduction (HC-SCR) catalyst. For example, the LNC 50 may include vanadium, molybdenum, tungsten, zeolites, platinum, palladium, rhodium, gold, and the like. These and other catalysts may be bound to any suitable substrate and disposed in the LNC 50 in any suitable conformation. These catalysts may be configured to: convert carbon monoxide to carbon dioxide; aid in the conversion of NOx and/or hydrocarbons to water, carbon dioxide, and nitrogen; and the like. In addition, the LNC 50 may include superacids such as, for example sulfated zirconia and the like to catalyze the hydration of alkenes present in the exhaust 24 to alcohols and/or catalyze the cracking of alkanes to alkenes in the presence of oxygen. In this regard, oxygen is typically present in the exhaust 24 in lean combustion conditions.

Optionally, the LNC 50 may include other catalysts to catalyze other reactions. For example, the LNC 50 may include vanadium, molybdenum, tungsten, zeolites, platinum, palladium, rhodium, gold, and the like. If included, these one or more addition catalysts may be configured to: convert carbon monoxide to carbon dioxide; aid in the conversion of NOx and/or hydrocarbons to water, carbon dioxide, and nitrogen; and the like.

The reductant injection system 52 is optionally included in the NOx control system 22. For example, depending on the fuel used by the engine 12 and/or the type of combustion, the exhaust 24 may include sufficient HC to catalytically convert the NOx present in the exhaust 24 and the reductant injection system 52 may be omitted. However, in examples in which sufficient HC are not present in the exhaust 24, the reductant injection system 52 may be configured to generate and/or inject the HC or other reductants into the exhaust 24. In a particular example, the reductant injection system 52 is configured to inject the HC into the exhaust 24 in response to a signal from the controller 54. The HC may include any suitable HC such as, for example: an alcohol synthesized from constituents present in the exhaust 24; fuel from the fuel system 18; a secondary fuel from a secondary fuel system 56 that is optional; and the like. Both the fuel from the fuel system 18 and the secondary fuel from the secondary fuel system 56 may include any suitable fuel such as, for example, gasoline, natural gas, methane, propane, diesel, alcohols such as methanol and ethanol, mixtures thereof, and the like.

The controller 54 is optionally included for aspects of the disclosure in which parameters such as fuel, air, and NOx are sensed and/or components the NOx control system 22 are modulated by the controller 54. However, as described herein, in some aspects, reactions may be performed to convert components in the exhaust 24 into suitable reductants to convert NOx into nitrogen and other products. In such examples, the controller 54 may be omitted. If included, the controller 54 preferably a computing device such as a processor, application specific integrated circuit (ASIC), or the like.

The controller 54 is generally configured to communicate with the various sensors and/or the reductant injection system 52, determine a methane number of the fuel in the fuel system 18, determine a reductant potential of the exhaust 24, calculate a reductant dose to be injected into the exhaust system 20, determine error states, and the like. More particularly, the controller 54 may be configured to send and/or receive signals to/from the throttle position sensor 30, the fuel quality sensor 32, and/or the exhaust sensor 34. The controller 54 may be configured to determine the amount of NOx that is being produced by the engine in response to signals from the throttle position sensor 30, the fuel quality sensor 32, and/or the exhaust sensor 34. The controller 54 may be configured to determine the methane number of the fuel in response to signals from the fuel quality sensor 32. The controller 54 may be configured to determine reductant potential of the exhaust 24 in response to signals from the exhaust sensor 34. The controller 54 may be configured to control the reductant injection system 52 to generate and/or inject HC into the exhaust system based upon the determined amount of NOx being produced or based upon the determined amount of NOx being produced minus the reduction potential of the exhaust 24.

In general, oxides of nitrogen (NOx) that are present in the exhaust 24 of the engine 12 may be reduced in the LNC 50 in the presence of a hydrocarbon via the following reaction:

$$NOx+HC=H_2O+CO_2+N_2 \qquad \text{Eq. 1}$$

The above Eq. 1 is not balanced and includes the abbreviations NOx and HC for the various oxides of nitrogen and any suitable hydrocarbon, respectively. Depending upon the fuel combusted in the engine 12 and the type of combustion performed (lean, balanced, or rich), HC may be present in the exhaust 24 natively at a sufficient concentration to catalytically convert the NOx as shown in Eq. 1. However, in lean combustion, there is typically an overabundance of oxygen and relatively little HC remaining in the exhaust 24 to be used as a reductant for the NOx. In this situation, a suitable reductant may be generated and/or introduced by the NOx control system 22. As described herein, particularly suitable hydrocarbons include alcohols that may be generated in situ via catalyzing the hydration of alkenes in the exhaust 24 to alcohol with a suitable superacid catalyst and/or cracking alkanes in the presence of oxygen (both present in the exhaust 24) with a suitable superacid catalyst, for example. Examples of suitable superacid catalysts include sulfated zirconia that may be present before and/or within the LNC 50. The reduction of NOx using alcohols may be performed in any suitable manner, including catalyzing the reaction with a suitable catalyst such as, for example, The alcohol may be generated in any suitable manner. Examples of suitable methods of alcohol production include: 1) natural gas reformation to generate synthesis gas (syngas) followed by methanol synthesis; 2) dissociation of hydrogen from water (via electrolysis for example) reacted with carbon dioxide—both water and carbon dioxide are found in the exhaust 24; 3) hydration of alkenes present in the exhaust 24 to generate alcohol; 4) cracking alkanes present in the exhaust 24 to alkenes followed by hydration of alkenes to generate alcohol; and the like. In the above example 1, syngas may be produced in an autothermal reformer via one or more of the following reactions:

$$2CH_4+O_2=2CO+4H_2O \qquad \text{Eq. 2}$$

$$CH_4+H_2O=CO+3H_2 \qquad \text{Eq. 3}$$

$$CO+H_2O=CO_2+H_2 \qquad \text{Eq. 4}$$

Methanol synthesis is performed by catalyzing the products or a purified portion of the products of the above reaction via one or more of the following reactions:

$$CO_2+3H_2=CH_3OH+H_2O \qquad \text{Eq. 5}$$

$$CO+2H_2=CH_3OH \qquad \text{Eq. 6}$$

$$CO+H_2=CO\pm H_2O \qquad \text{Eq. 7}$$

In the above example 2, hydrogen gas may be produced by electrolysis via the following reaction:

$$2H_2O=2H_2+O_2 \qquad \text{Eq. 8}$$

The hydrogen gas product from Eq. 8 is then reacted with carbon dioxide (from the exhaust 24 of the engine 12, for example) via the reaction of Eq. 5 to synthesize methanol. The excess oxygen of Eq. 8 may be vented to the atmosphere or fed to the engine 12.

In the above example 3, hydration of alkenes present in the exhaust 24 to generate alcohol may be performed via the following reaction in the presence of an acid catalyst such as the superacid sulfated zirconia:

$$RCH=CH_2+H_2O=RCH-CHOH \qquad \text{Eq. 9}$$

The alcohol product from Eq. 9 may be synthesized in the exhaust 24 and then used a reactant to reduce NOx.

In the above example 4, cracking alkanes present in the exhaust 24 to alkenes to generate the alkenes for use in Eq. 9 to produce alcohol may be performed via the following reaction in the presence of an acid catalyst such as the superacid sulfated zirconia:

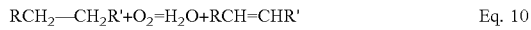

$$RCH_2-CH_2R'+O_2=H_2O+RCH=CHR' \qquad \text{Eq. 10}$$

The alkene product from Eq. 10 may be synthesized in the exhaust 24 and then used a reactant in Eq. 9 to produce an alcohol.

According to an aspect of the disclosure, the controller 54 is configured to determine a methane number of the fuel in the fuel system 18, determine a reductant potential of the exhaust 24, calculate a reductant dose to be injected into the exhaust system 20, determine error states, and the like. Measurements associated with the throttle position sensor 30, the fuel quality sensor 32, and/or the exhaust sensor 34 may be received by the controller 54 and utilized to determine the methane number of the fuel, the reductant potential of the exhaust 24, the amount of NOx in the exhaust 24, the reductant dose to be injected into the exhaust system 20, and the like. For example, the controller 54 may be configured to determine the amount of NOx that is being produced by the engine in response to signals from the throttle position sensor 30, the fuel quality sensor 32, and/or the exhaust sensor 34. More particularly: the exhaust sensor 34 may directly sense the NOx in the exhaust 24; the controller 54 may compare signals from the throttle position sensor 30 to an empirically derived table of throttle position to NOx output, for example; and the controller 54 may utilize sensor reading from the fuel quality sensor 32 to calculate the methane number of the fuel and then use the methane number of the fuel to calculate the natively present HC. The natively present HC may offset the NOx in the exhaust 24.

In another example, the controller 54 may be configured to determine the methane number of the fuel in response to signals from the fuel quality sensor 32. In yet another example, the controller 54 may be configured to determine reductant potential of the exhaust 24 in response to signals from the exhaust sensor 34. In yet another example, the controller 54 may be configured to control the reductant injection system 52 to generate and/or inject HC into the exhaust system based upon the determined amount of NOx being produced or based upon the determined amount of NOx being produced minus the reduction potential of the exhaust 24.

Figure 2:
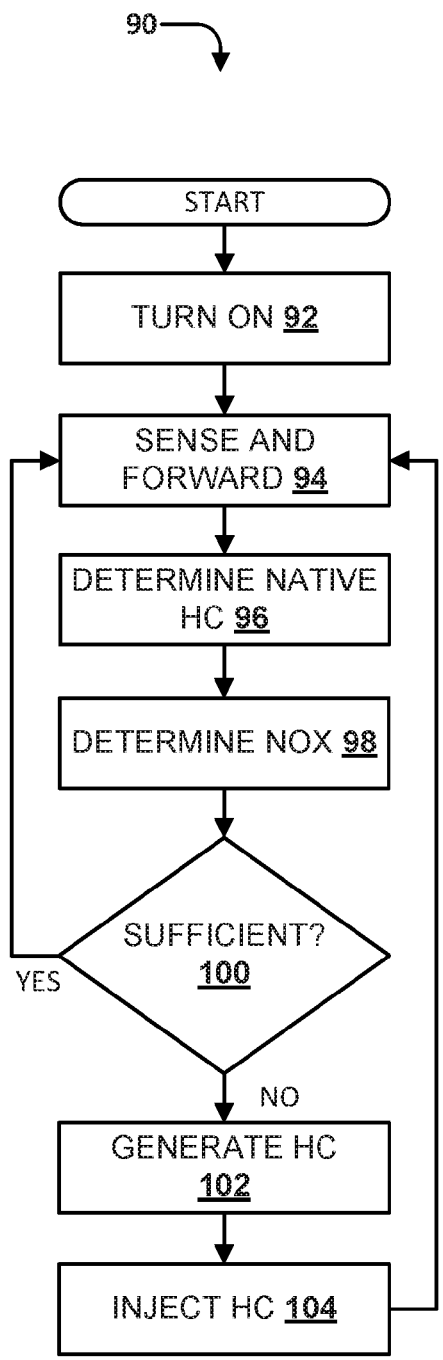
FIG. 2 is a flow diagram for controlling oxides of nitrogen in an exhaust of the engine system, according to an aspect of the disclosure.

FIG. 2 is a flow diagram of a method 90 according to various aspects of the disclosure. Of note, in some aspects of the disclosure, NOx may be automatically reduced and the method 90 may be omitted or optional. For example, the superacid catalyst disposed in the LNC 50 may catalyze the reaction of alkenes and/or alkanes naturally present in the exhaust 24 to alcohols suitable for reducing NOx to nitrogen and other products. In these and some other aspects of the disclosure, the reactions may occur automatically and the following method 90 may be omitted. If performed, as shown in FIG. 2, the method 90 is initiated in response to turning on the NOx control system 22 at step 92. For example, the engine system 10 may be energized to start the engine 12 and the NOx control system 22 may be energized concurrently.

At step 94, one or more of the throttle position sensor 30, the fuel quality sensor 32, and the exhaust sensor 34 may sense the respective conditions and forward signals corresponding to the sensed conditions to the controller 54. For example, the throttle position sensor 30 may sense a throttle position or an air mass flow, the fuel quality sensor 32 may sense a methane number of the fuel in the fuel system 18, and/or the exhaust sensor 34 may sense one or more of a NOx concentration, a HC concentration, an alkene concentration, and an alkane concentration. These and other signals may be forwarded to the controller 54 in response to being sensed at step 94.

At step 96, a native HC concentration present in the exhaust 24 may be determined based upon the conditions sensed at step 94. For example, the native HC concentration may be sensed directly via the exhaust sensor 34 and/or may be calculated by the controller 54 based on the sensed methane number. In addition, the signals from the throttle position sensor 30 may be utilized to help predict the native HC concentration.

At step 98, the NOx concentration in the exhaust 24 may be determined based on one or more of the signals from the throttle position sensor 30, the fuel quality sensor 32, and the exhaust sensor 34. For example, the NOx concentration in the exhaust 24 may be determined directly based on the signals from the exhaust sensor 34. In addition or alternatively, the NOx concentration in the exhaust 24 may be determined or calculated based on the signals from the throttle position sensor 30 and/or the fuel quality sensor 32.

At step 100, it is determined if the native HC concentration is sufficient to reduce the NOx concentration in the exhaust 24. For example, the NOx concentration may be used to determine a stoichiometric concentration or amount of HC to balance the reduction equation such as Eq. 1. Other factors such as reaction efficiency and the like may be incorporated as well. If, at step 100, it is determined that the native HC concentration is sufficient to reduce the NOx concentration in the exhaust 24, the respective conditions may be sensed and signals corresponding to the sensed conditions may be forwarded to the controller 54 at step 94. If, at step 100, it is determined that the native HC concentration is insufficient to reduce the NOx concentration in the exhaust 24, a supplemental amount of HC may be generated at step 102 and/or the supplemental amount of HC may be injected into the exhaust 24 at step 104.

At step 102, the supplemental amount of HC may be generated. In a particular example, a suitable alcohol may be generated. The alcohol may be generated in any suitable manner. Examples of suitable methods of alcohol production include: 1) natural gas reformation to generate synthesis gas (syngas) followed by methanol synthesis; 2) dissociation of hydrogen from water (via electrolysis for example) reacted with carbon dioxide—both water and carbon dioxide are found in the exhaust 24; 3) hydration of alkenes present in the exhaust 24 to generate alcohol; 4) cracking alkanes present in the exhaust 24 to alkenes followed by hydration of alkenes to generate alcohol; and the like. However, in other examples, the generation of the supplemental HC may be omitted. For example, the supplemental HC may be provided by the fuel system 18 and/or the secondary fuel system 56 and the supplemental HC may be injected into the exhaust 24 at step 104.

At step 104, the supplemental HC may be injected into the exhaust 24. For example, the reductant injection system 52 may inject the supplemental HC into the exhaust 24 at the LNC 50 or upstream of the LNC 50. In this manner the supplemental HC may disperse in the exhaust 24 sufficiently.

Thereafter, the respective conditions may be sensed and signals corresponding to the sensed conditions may be forwarded to the controller 54 at step 94. The method 90 may continue to be performed while the engine 12 is energized. It is to be noted that the steps for the method 90 need not proceed in the order presented, but rather, may proceed in any suitable order and/or concurrently.

INDUSTRIAL APPLICABILITY

The present disclosure may be applicable to any engine driven by internal combustion. Aspects of the NOx control system 22 and the method 90 disclosed herein may promote improved NOx reduction performance, improved fuel efficiency, decrease maintenance costs, and improve functionality, operational flexibility, performance, and energy efficiency of engine systems and engine performance.

Hydrocarbon selective catalytic reduction (HC-SCR) catalyst generally depend upon hydrocarbon (HC) being present in the exhaust in order to serve as a reductant for the NOx. However, in lean combustion conditions, HCs are not typically present in sufficient concentration. As described herein, the inventors have invented a novel system and method and variations thereon to reduce NOx in these challenging conditions while maximizing fuel efficiency and minimizing the use of additional HC sources being added to the exhaust. In an aspect disclosed herein, the inventors realized that alkenes and/or alkanes are generally present in the exhaust in lean combustion conditions. The inventors further realized that alkenes can be catalytically hydrated into an alcohol via a superacid catalyst in the exhaust due to the presence of water in the exhaust. Furthermore, the inventors realized that alkanes present in the exhaust can be cracked via the superacid catalyst in the exhaust 24 due to the presence of excess oxygen in the exhaust 24. This superacid catalyst can be co-located with the HC-SCR catalyst in the LNC 50, may be present in an upstream portion of the LNC 50, and/or disposed upstream of the LNC 50 in order to generate the alcohol reductant for the reduction of the NOx by HC-SCR catalyst disposed in the LNC 50.

In another aspect, the alcohol reductant may be synthesized via natural gas reformation to generate synthesis gas (syngas) followed by methanol synthesis and/or by dissociation of hydrogen from water (via electrolysis for example) reacted with carbon dioxide.

In yet another aspect, the amount of supplemental HC added to the exhaust 24 may be controlled based upon a determined or calculated amount of HC to stoichiometrically balance the reduction of the NOx present in the exhaust 24. For example, the concentration of HC present in the exhaust 24 may vary in accordance with a methane number of the fuel. As such, the methane number of the fuel may be sensed and this sensed value may be used to determine if a supplemental HC is injected into the exhaust 24 in order to sufficiently reduce the NOx.

According to various aspects of the disclosure, with reference to FIG. 1, the reduction of NOx may be performed automatically and/or may be controlled via the controller 54. For example, as described herein, the superacid catalyst may be disposed in the LNC 50 and operable to convert alkenes/alkanes to alcohol for use as the reductant. In another example, the NOx control system 22 includes sensors such as the throttle position sensor 30, the fuel quality sensor 32, and the exhaust sensor 34 to sense the conditions in the engine system 10 and forward signals associated with these conditions to the controller 54. In operation, the controller 54 is configured to utilize these signals to control the reductant injection system 52 to inject sufficient reductant into the exhaust 24 to reduce the NOx in the LNC 50. The reductant may be synthesized via constituents in the exhaust 24 and/or may be provided via the fuel system 18 and/or secondary fuel system 56.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Throughout the disclosure, like reference numbers refer to similar elements herein, unless otherwise specified.

We claim:

1. A NOx control system to selectively reduce NOx present in an exhaust, the NOx control system comprising:
    a lean NOx catalyst including:
        a substrate; and
        a hydrocarbon selective catalytic reduction (HC-SCR) catalyst disposed on the substrate, wherein the HC-SCR catalyst catalyzes a reduction of NOx with an alcohol; and
    an alcohol generator to generate the alcohol;
    wherein the alcohol generator is a superacid catalyst disposed on the substrate and the superacid catalyst catalyzes a reaction to convert an exhaust constituent into the alcohol.

2. The NOx control system according to claim 1, wherein the superacid catalyst catalyzes a hydration of an alkene present in the exhaust into the alcohol.

3. The NOx control system according to claim 2, wherein the superacid catalyst catalyzes a cracking of an alkane present in the exhaust into the alkene.

4. The NOx control system according to claim 1, wherein the superacid catalyst is sulfated zirconia.

5. The NOx control system according to claim 1, wherein the alcohol generator includes a reductant injection system configured to synthesize the alcohol and inject the alcohol into the exhaust.

6. The NOx control system according to claim 5, wherein the reductant injection system includes an autothermal reformer to generate a syngas from methane and the reductant injection system is configured to synthesize the alcohol from the syngas.

7. The NOx control system according to claim 5, wherein the reductant injection system is configured to generate hydrogen gas from an electrolysis of water and react the hydrogen gas with carbon dioxide to synthesize the alcohol.

8. The NOx control system according to claim 5, further comprising:

a controller configured to control the reductant injection system to inject the alcohol into the exhaust.

9. The NOx control system according to claim 8, further comprising:
a sensor configured to send a signal to the controller, wherein the controller is configured to determine an amount of the alcohol to add to the exhaust in response to the signal and the controller is configured to control the reductant injection system to inject the alcohol into the exhaust based on the determined amount of the alcohol to add to the exhaust.

\* \* \* \* \*